Patented July 15, 1924.

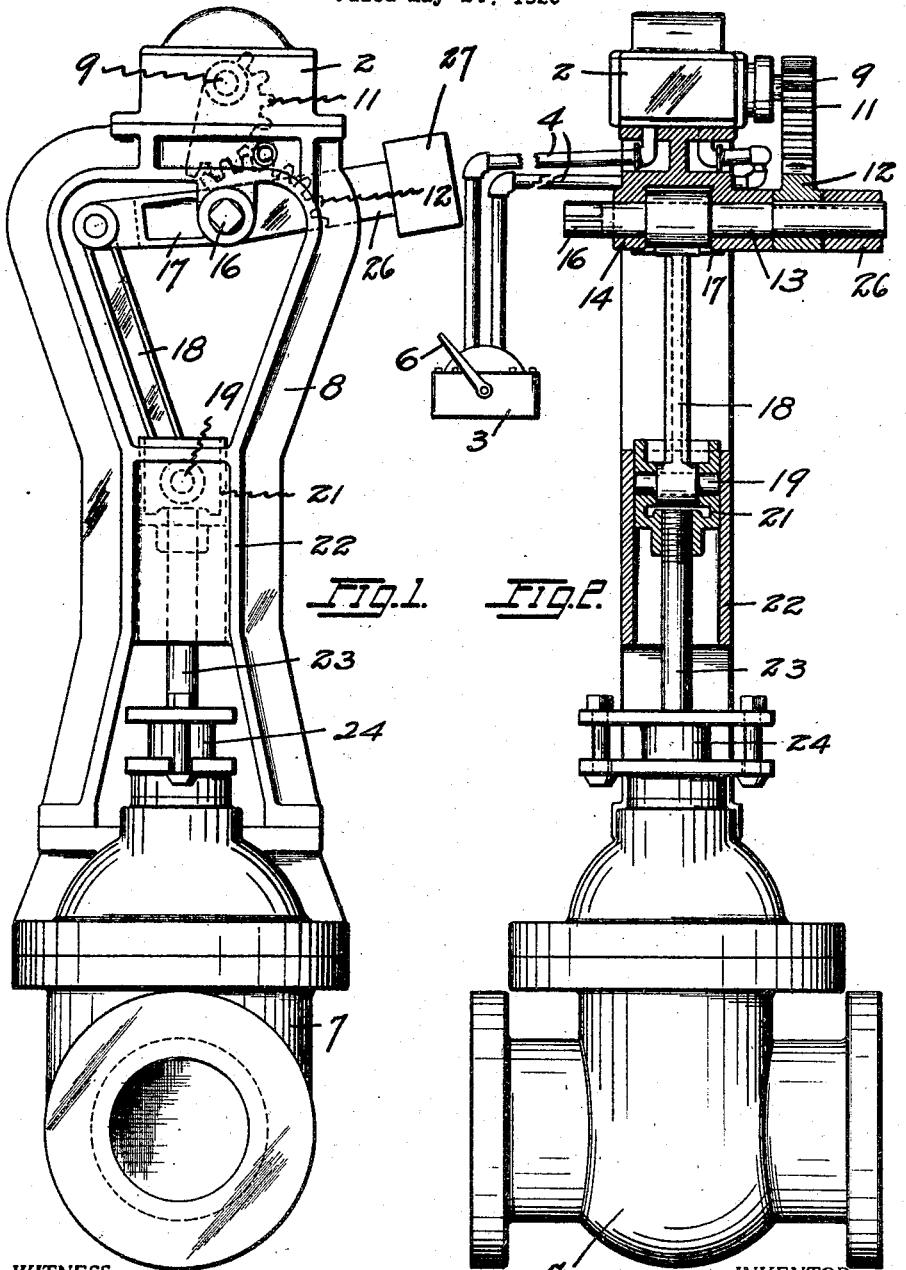

1,501,340

UNITED STATES PATENT OFFICE.

HORACE L. HIRSCHLER, OF SAN FRANCISCO, CALIFORNIA.

CONTROL MECHANISM.

Application filed May 24, 1920. Serial No. 383,760.

*To all whom it may concern:*

Be it known that I, HORACE L. HIRSCHLER, a citizen of the United States, and a resident of the city and county of San Francisco and State of California, have invented a new and useful Control Mechanism, of which the following is a specification.

My invention relates to means for moving elements requiring a large force to initiate their movement, and a smaller force to continue their movement.

An object of the invention is to provide a control mechanism, applicable, for example to valves and in which an initially large force is supplied for cracking open the valve, this force decreasing as the flow of fluid thru the valve increases.

Another object of the invention is to provide an apparatus of the character described for controlling from a distance such apparatus as that referred to.

The invention possesses other features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

In the following specification, I shall describe my invention in connection with a valve, subjected to large pressures, but it will be understood that it is applicable to the control of any apparatus.

Referring to the drawings: Fig. 1 is a front elevation of a valve control mechanism in accordance with my invention. Fig. 2 is a side elevation of the same, portions being shown in section, and the remote primary motor for operating the valve also being shown in diagram.

The present embodiment of my invention is for controlling the operation of valves subjected to high pressures and requiring a relatively large force to initiate their opening movement, but further than this, it is intended for the control of such valves from a remote control station. To accomplish these results, I use motion transmitting devices comprising a secondary motor 2 arranged adjacent the valve and actuated by fluid under pressure from a primary motor 3, arranged at the remote control station, and connected to the secondary motor by conductors 4. The primary motor is operated preferably by a hand lever 6. While any of the known motion transmitting devices may be used, I prefer those forming the subject of United States Letters Patent No. 976,907 of Nov. 29, 1910.

The valve housing 7 is provided with a frame 8 secured thereto, upon the top of which is arranged the secondary motor 2 above referred to. The secondary motor is provided with a shaft 9 upon which is fixed a gear 11 of varying radii, preferably a segment of elliptical gearing in mesh with a second similar gear 12, fixed on the shaft 13, which is journaled in bearings 14 formed in the frame. The shaft terminates on the opposite side of the frame in a squared end 16 over which a socket handle may be fitted in case of need.

Fixed on the shaft 13 also, is the lever arm 17, the end of which is connected pivotally to the link 18, the other end of which is pivoted by pin 19 to cylindrical cross head 21 reciprocally mounted in cylindrical ways 22 arranged on the frame. To the cross head is threaded the valve stem 23, passing through the stuffing box 24 to the valve withing the housing. Adjustment of the distance between the valve stem and the end of arm 17 is desirable at times for the purpose of insuring complete seating of the valve in the lower position of the arm. This is accomplished by removing the pin connecting the link 18 to the arm 17, whereupon the cross head may be turned one or more half revolutions on the threaded end of the valve stem.

Fixed for rotation with the shaft 13 is an arm 26 upon the end of which is a weight 27, of such mass that the weight of the valve and operating parts are balanced. Thus the force exerted by the secondary motor may be directed wholly to the movement of the valve.

From the above and from Fig. 1 it will be clear that with the valve closed there are two distinct though concurrently acting means; that is to say, compound means each augmenting the other for converting the torque of the shaft 9 into an initially large, but subsequently decreasing force applied to the cross head to open the valve, the parts then being as shown in Fig. 1. One of these means is the link-and-lever connection.

The length of the effective lever arm when the arm 17 is down and the valve closed is zero. With rotation of the shaft 13, the length of the effective lever rapidly increases with corresponding decrease in force applied to the rising valve. A similar condition is observed with the elliptical gears. With the valve closed the gear 11 at its smaller diameter is engaged with the gear 12 at its larger diameter, so that the torque of the secondary motor shaft 9 is proportionately decreased in the torque of the shaft 13, as the valve opens.

Thus both of the means described operate to convert the torque of the motor shaft when it first begins to rotate into a force of much greater intensity, but acting at a proportionately slower speed, and this force acting on the valve by the mediate connections described first forces it off of its seat or cracks it open. After the valve has once opened and fluid is flowing, progressively less force is needed to open the valve further. The shape and relationship of the parts described convert the torque of the shaft 9 into progressively less and less force applied with a corresponding increase in speed of movement of the cross head and attached valve.

Thus when the motor shaft 9 is turned by the influx of pressure fluid from the primary motor 3 at the control station, the mediate connections apply to the valve a very greatly increased force which slowly cracks open the valve, and then with diminishing force, but increasing speed moves the valve to the open position. Reversing the operation, the valve moves to its seat with decreasing speed but an increasing force of control so that the valve finally is seated without being slammed by the interrupted flow of fluid therethru.

I claim:

1. A valve control comprising a shaft, means for turning the shaft, and compound means each augmenting the other adapted to connect a valve to said shaft whereby the torque of said shaft is converted into an initially large but subsequently decreasing force applied to said valve in the opening movement thereof.

2. A valve control comprising a motor, a shaft adapted to be driven by the motor, and compound means, each augmenting the other adapted to connect a valve to said shaft whereby the torque of said shaft may be converted into an initially large but subsequently decreasing force applied to the valve in the opening movement thereof.

3. The combination with an element movable from one position to another and which requires a large moving force at the beginning of its movement and a lesser moving force at the end of its movement, of a shaft, means for turning the shaft, and compound means each augmenting the other for connecting said element to said shaft whereby the torque of the shaft is converted into an initially large and subsequently decreasing force applied to said element.

4. The combination with an element movable from one position to another and which requires a large moving force at the beginning of its movement and a lesser moving force at the end of its movement, of a motor, a shaft adapted to be driven by the motor, and compound means, each augmenting the other for connecting said element to said shaft whereby the torque of said shaft is converted into an initially large and subsequently decreasing force applied to said element.

In testimony whereof, I have hereunto set my hand at San Francisco, California, this 18th day of May, 1920.

HORACE L. HIRSCHLER.

In presence of—
H. G. PROST.